(No Model.)
J. I. RICHEY.
AUTOMATIC VALVE FOR DRINKING TROUGHS.
No. 319,025. Patented June 2, 1885.
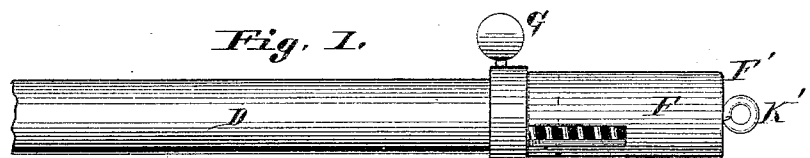
Fig. 1.
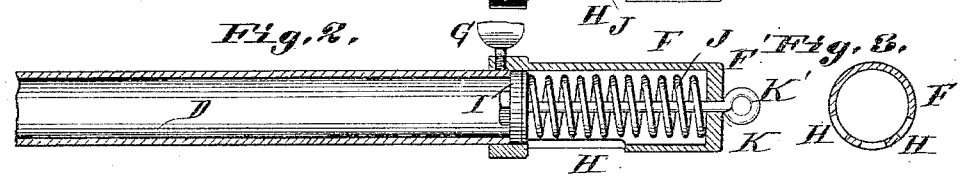
Fig. 2. Fig. 3.
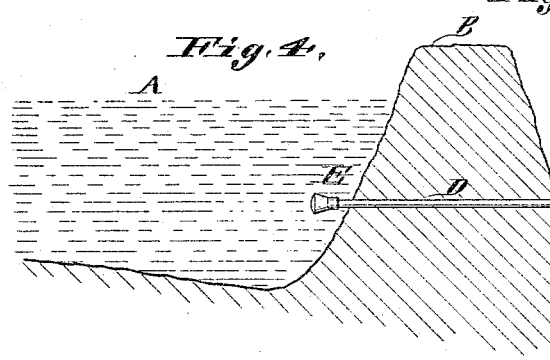
Fig. 4.
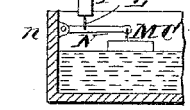
Fig. 7.
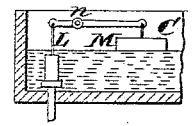
Fig. 8.
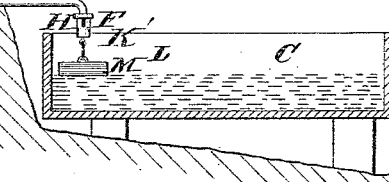
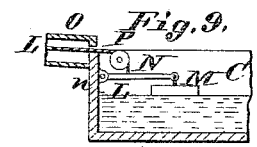
Fig. 9.
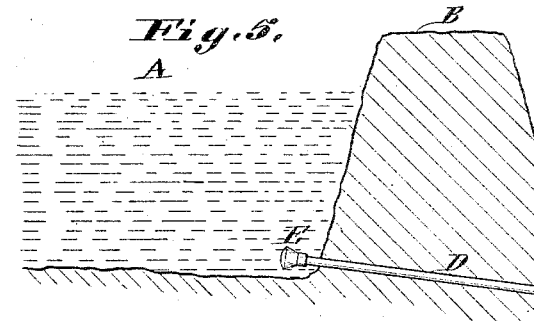
Fig. 5.
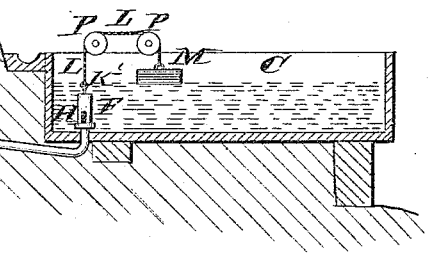
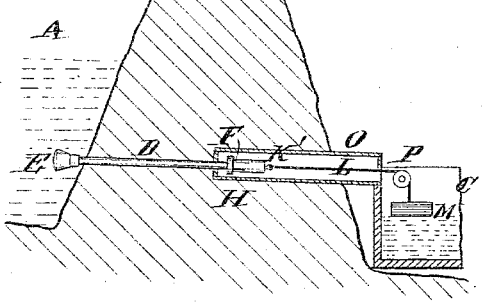
Fig. 6.
Attest:
Geo. L. Wheelock
Victor A. Lewis
Inventor:
James I. Richey
By Knight Bro.
Attys.
N. PETERS, Photo-Lithographer, Washington, D. C.

UNITED STATES PATENT OFFICE.

JAMES I. RICHEY, OF OLNEY, ILLINOIS.

AUTOMATIC VALVE FOR DRINKING-TROUGHS.

SPECIFICATION forming part of Letters Patent No. 319,025, dated June 2, 1885.

Application filed January 22, 1885. (No model.)

*To all whom it may concern:*

Be it known that I, JAMES I. RICHEY, of Olney, in the county of Richland and State of Illinois, have invented a certain new and useful Improvement in Automatic Valves for Drinking-Troughs, of which the following is a full, clear, and exact description, reference being had to the accompanying drawings, forming part of this specification.

The device is for the purpose of keeping the drinking-trough filled to a given level with water.

I am aware that such devices are not in themselves new, broadly considered, but such devices as heretofore constructed have been either imperfect in their operations or else of complicated construction, rendering them unfit for use in such places as stock-troughs.

The object of my present invention is therefore to provide a valve which shall be at the same time simple, cheap, and effective, and in order that my invention may be fully understood, I will proceed to describe it, with reference to the accompanying drawings, in which—

Figure 1 is a side view of the valve with a portion of water-pipe. Fig. 2 is an axial section thereof. Fig. 3 is a transverse section of the cap in which the valve works. Figs. 4, 5, and 6 are sectional views illustrating various ways of carrying out the invention. Figs. 7, 8, and 9 are detail vertical sections showing modifications of the device.

A is a water-reservoir.

B is a wall or embankment.

C is a drinking-trough.

D is a pipe discharging the water from the reservoir into the trough.

E is a strainer at the receiving end of the pipe D.

F is a cylindrical cap or valve-case, which is secured to the discharging end of the pipe D, the connection being made by any suitable means. I show the cap slipping over the end of the pipe a little distance and secured by a set-screw, G; but the parts may be secured together by screw-threads or in any other way. The cap or case has slots H or other orifice or orifices for the passage of water.

I is a valve closing against the end of the pipe D as a seat, and held to its seat by a spiral spring, J, one end of which bears against the valve and the other end against the end F' of the cap or case F.

K is a valve-stem working through an orifice in the end F', and having an eye, K', to which is attached a cord, chain, or wire, L, whose other end is connected directly to a float, M, or to a lever, N, which is connected to the float. The former construction is shown in Figs. 4, 5, and 6, and the latter in Figs. 7, 8, and 9.

By seating the valves I directly upon the pipe D, and securing the cap or case F adjustably thereto, a simple and efficient means is provided for regulating the tension of the spring J, so as to adapt it for use where there is either a very heavy or a very light pressure of water.

In Fig. 4 the cap F is in a vertical position, the outer end of the pipe D being turned downward, and the chain or wire extending down vertically to the float. When the surface of the water falls in the trough C, the weight of the float opens the valve I and allows the water to flow from the reservoir into the trough until the float is raised and allows the valve to close.

In Fig. 5 the outer end of the pipe D is bent upward and extends through the bottom of the trough. The chain L extends over two pulleys, P P, and its depending end is attached to the float.

In Fig. 6 the cap is horizontal, as shown in Figs. 1 and 2, and is within a pipe or box, O, which serves to protect the valve from frost and from disturbance by animals. The cord or chain L extends from the valve-stem to a pulley, and its depending end is secured to the float.

In Fig. 7 the valve is in the same position as seen in Fig. 4; but the chain L is attached to a lever, N, one end of which is fulcrumed to the trough and the other end attached to the float.

In Fig. 8 the valve is in the same position as in Fig. 5; but the chain, instead of passing over the pulleys P P, is attached to one end of a lever, N, which is fulcrumed at $n$ to the trough or other object, and whose other end is connected to the float M.

In Fig. 9 the arrangement of the valve is supposed to be similar to that shown in Fig. 6; but the chain L, instead of being directly connected to the float M, is connected to a lever, N, one end of which is fulcrumed at $n$ and the other end connected to the float.

In all of these modifications the construction is substantially the same—that is to say, the descent of the float below a certain level draws the valve open, compressing the spring J, and the rising of the float allows the spring to act upon the valve and close it.

In the modification shown in Fig. 5 the pipe D is buried in earth, except the immediate end to which the valve case or cap F is attached, and the latter is immersed in water, so that the parts may be preserved from freezing.

I am aware that the supply-pipes of water-tanks have been provided with valves which are controlled by a float resting upon the water in such tanks, and, also, that the arms to which said floats are secured have been made so adjustable as to permit of varying the force with which said valves are pressed against their seats, and do not therefore claim such, broadly, as my invention; but What I do claim as my invention, and desire to secure by Letters Patent, is—

1. The combination, with the supply-pipe and a valve seated thereon, of a valve case or cap fitted adjustably on the end of said pipe, a spring interposed between said valve and the end of said cap, and a weighted float connected with said valve, all constructed and arranged to operate substantially as set forth.

2. The combination, with the pipe D and the valve I, seated thereon, of the cap or valve-case F, secured adjustably to the end of said pipe by means of set-screw G, the spring J, interposed between said valve and the end of said cap or case, the valve-stem K', and the float M, suspended directly from said stem, substantially as and for the purpose set forth.

JAMES I. RICHEY.

Witnesses:
SAML. KNIGHT,
GEO. H. KNIGHT.